United States Patent

Mariën

[11] Patent Number: 5,989,794
[45] Date of Patent: Nov. 23, 1999

[54] POLYALKYLENE NAPHTHALATE COMPRISING SPECIFIC UV-ABSORBER

[75] Inventor: August Mariën, Westerlo, Belgium

[73] Assignee: Agfa-Gevaert, N.V., Mortsel, Belgium

[21] Appl. No.: 09/116,234

[22] Filed: Jul. 16, 1998

[30] Foreign Application Priority Data

Aug. 29, 1997 [EP] European Pat. Off. .............. 97202663

[51] Int. Cl.⁶ .......................... G03C 1/795; G03C 1/815; C08K 5/34; C08K 5/48
[52] U.S. Cl. .......................... 430/512; 430/533; 428/480; 524/86; 524/218; 524/290; 524/291; 524/292
[58] Field of Search .................................... 430/512, 533; 428/480; 524/86, 218, 290, 291, 292

[56] References Cited

U.S. PATENT DOCUMENTS 5,593,818  1/1997  Kawamoto ............................... 430/533
5,688,636  11/1997  Kiekens .................................. 430/512

FOREIGN PATENT DOCUMENTS 0 631 177 A1  12/1994  European Pat. Off. .
0 664 480 A2   7/1995  European Pat. Off. .
0 747 756 A1  12/1996  European Pat. Off. .

OTHER PUBLICATIONS

H. Laver: "The Use of UV–Absorbers in X–Ray Photographic Films," Research Disclosure No. 248, Dec. 1984, Havant GB, p. 598, XP002054694.

*Primary Examiner*—Richard L. Schilling
*Attorney, Agent, or Firm*—Breiner & Breiner

[57] ABSTRACT

Disclosed is a polyalkylene naphthalate film, preferably the homopolymer of naphthalene-2,6-dicarboxylic acid and ethylene glycol (PEN), comprising a UV absorbing compound of general formula Q—CO—CO—X (explained in the description) for quenching of the UV fluorescence at 429 nm. The polymeric film is preferably used as support for a photographic material, preferably a colour negative or colour reversal photographic material.

7 Claims, No Drawings

POLYALKYLENE NAPHTHALATE COMPRISING SPECIFIC UV-ABSORBER

DESCRIPTION

1. Field of the Invention

The present invention relates to a polymeric film and to a photographic material using this polymeric film as a support.

2. Background of the Invention

In recent years polyalkylene naphthalate has been used for various applications thanks to its excellent physical properties. For instance, polyethylene naphthalate is used as a film having high strength and high elasticity modulus in various types of audio tapes and video tapes. Polybutylene naphthalate is also used for various resin applications. However, it is known that polyalkylene naphthalate has the drawback of emitting pale fluorescence with a peak at 429 nm when it is exposed to ultraviolet light, leading to a problem with its outer appearance for application in food packages and beverage bottles. Studies on the mechanism of the fluorescence of a poly(1,2-ethylene-2,6-naphthalene dicarboxylate) film have been reported in the Journal of Polymer Science: Polymer Letters Edition, vol.17, pp. 227–232 (1979), which discloses that the fluorescence is emitted from an excimer of naphthalate.

It has been reported in the U.S. Pat. No. 5,310,857 that fluorescence of such polyalkylene naphthalate can be suppressed efficiently by copolymerizing a relatively small amount of an aromatic ketone. However, this is a cumbersome and expensive procedure.

JP-A-59-12 952 (the term "JP-A" as used herein means an "unexamined Japanese patent publication") discloses a method for protecting various types of resins from ultraviolet light by mixing a compound having a cyclic imino ester in its molecule with the resins.

Use of a phenylquinoxaline as a stabilizer for polymers having a halogen atom in the molecule is disclosed in the specification of U.S. Pat. No. 3,325,446. However this reference is totally silent about the prevention of fluorescence from the polymer.

The specifications of U.S. Pat. No. 5,391,330 and U.S. Pat. No. 5,391,702 disclose a process comprising melt-blending a naphthalenedicarboxylic acid containing polymer with 0.1 to 5% by weight of a fluorescence quenching compound chosen from a halogen containing aromatic compound, an aromatic ketone, and a naphtol compound.

Protective layers containing a UV-absorber and coated on top of resin molded articles are disclosed e.g. in JP-B-60-53701 (the term "JP-B-" meaning "examined Japanese patent publication"), JP-A-2-150431, JP-A-2-38128, JP-B-5-86973 and JP-B-37212.

In EP 0 711 803 a method is disclosed for quenching the fluorescence from polyalkylene-2,6-dicarboxylate by addition of a cyclic imino ester or of a quinoxaline compound.

In very recent time polyethylene-2,6-dicarboxylate (PEN) has found a new application as support for photographic materials, more particularly colour negative and colour reversal materials that are slit, cut and packaged according to the so-called Advanced Photo System (APS), which uses cartridges with a smaller total diameter then the traditional 35-mm cartridges. The choice of PEN as support is dictated by the fact that it is less susceptible than the more tradionally used polyethylene terephthalate (PET) to so-called core set curl, or "memory curl", when it is kept in winded state for a long time and/or is exposed to high temperatures (e.g. as can occur in a car during summer). Such curl adversely affects further photofinishing steps such as processing and printing. In U.S. Pat. No. 4,147,735 a method is disclosed for eliminating effectively the problem of core set curl in the case of PEN by means of a heat treatment. However the occurence of UV absorption and subsequent fluorescence emission tends to lead to a yellow discoloration of PEN when exposed to light during long storage periods, e.g. before coating with emulsions, or during storage after processing. Such a yellow hue will affect the printing properties in a irreproducible way.

In EP 0 631 177 a photographic material is disclosed using a polyethylene naphthalate support comprising an UV-absorber chosen from six particular chemical classes including hemioxonol and merostyryl compounds.

The problem with UV-fluorescence quenching compounds used in the prior art is the fact that they are insufficiently thermostable. However this property is from uttermost importance since the quencher has to be incorporated in the polyester in the molten state at high temperature. When the UV-absorber is substantially decomposed it will lose its effectiveness as quencher and moreover it will give rise to yellow coloured decomposition products.

It is an object of the present invention to provide a polyester film made of polyalkylene naphthalate containing effective compounds for suppressing the emission of UV-fluorescence.

It is a further object of the present invention to provide a polyester film made of polyalkylene naphthalate, suitable for a photographic material, which is hardly discoloured during storage.

It is still a further object of the present invention to provide a photographic material which is hardly susceptible to core set curl when kept in winded state for a long period.

It is still a further object of the present invention to provide a photographic material the photographic properties of which are hardly changed over time.

3. SUMMARY OF THE INVENTION

The objects of the present invention are realized by providing a polyester film made of polyalkylene naphthalate or a derivative thereof and containing an UV-absorber according to following general formula (I):

$$Q\text{—CO—CO—X} \qquad (I)$$

wherein Q represents a substituted or unsubstituted carbocyclic aromatic or hetero-aromatic ring, and —X represents —N(R$^1$)(R$^2$), —OR$^3$, or R$^7$, wherein each of R$^1$ and R$^2$ independently represents H, substituted or unsubstituted alkyl, substituted or unsubstituted aryl, or substituted or unsubstituted heteroaryl, and R$^7$ represents substituted or unsubstituted aryl, or substituted or unsubstituted heteroaryl; R$^3$ represents the same as R$^1$ and R$^2$ or a metal atom.

In a preferred embodiment Q— is represented by Y—Ar— wherein Ar represents a substituted or unsubstituted carbocyclic aromatic ring, and Y— represents —N(R$^4$)(R$^5$) or —OR$^6$, wherein R$^4$, R$^5$ and R$^6$ have the same definition as given for R$^1$, R$^2$ and R$^3$. In a most preferred embodiment Y— represents —N(R$^4$)(R$^5$).

In a preferred embodiment the polyalkylene naphthalate support is the homopolymer of 2,6-naphtalenedicarboxylic acid and ethylene glycol (100/100) (PEN).

Further belonging to the scope of the present invention is a photographic material comprising a support made of polyalkylene naphthalate or a derivative thereof and containing a compound as defined above.

4. DETAILED DESCRIPTION

First of all the notion "polyalkylene naphthalate or a derivative thereof" will now be explained in detail. This is a polyester made up of naphthalenedicarboxylic acid as a major acid component and a compound having two alcoholic hydroxyl groups as a major glycol component.

The acid component of the polyester is mainly naphthalenedicarboxylic acid, but a part (generally less than 50 mol %, preferably less than 30 mol %) of the naphthalenedicarboxylic acid may be replaced by one or more other difunctional carboxylic acids, for example, aromatic dicarboxylic acids, such as terephthalic acid, isophthalic acid, diphenyldicarboxylic acid, diphenyl ether dicarboxylic acid, diphenylsulfonedicarboxylic acid, and diphenoxyethanedicarboxylic acid; aliphatic dicarboxylic acids, such as adipic acid and sebacic acid; and oxy acids, such as oxybenzoic acid and ε-oxycaproic acid.

As the naphthalenedicarboxylic acid 2,6-naphthalenedicarboxylic acid, 2,7-naphthalenedicarboxylic acid, and 1,5-naphthalenedicarboxyiic acid are preferably used, the first one being the most preferred.

As the glycol component a compound is used having two alcoholic hydroxyl groups, for example, an aliphatic glycol, such as ethylene glycol, propylene glycol, trimethylene glycol, butanediol, neopentylene glycol, hexanediol, decanediol, and diethylene glycol; a cycloaliphatic glycol, such as cyclohexanedimethylol and tricyclodecanediol, and an aromatic diol, such as 2,2-bis(4-β-hydroxyphenyl)-propane, 1,1-bis(4-β-hydroxyethoxyphenyl)cyclohexane, and 4,4'-bis(β-hydroxyethoxy)diphenylsulfone, which may be used alone or as a mixture of one or more. A small amount of a compound having two phenolic hydroxyl groups, such as bisphenol A and bisphenol Z, can be additionally used. The preferred glycol component is simply ethylene glycol, present for at least 50% of the alcohol compounds, more preferably at least 70% and most preferably 100%.

Such a polyester can be produced in accordance with the conventionally known polyester production method usually including a transesterification step and a polycondensation step.

Further, the polyethylene naphthalate or its derivative for use in the present invention may be blended with another polyester.

Polymer blends can be formed easily in accordance with methods described in JP-A Nos. 5482/1974, 4325,1989, and 192718/1991, Research Disclosure Nos. 283,739–41, 284, 779–82, 294,807–14, and 294,807–14.

The glass transition point of the polyester for use in the present invention is preferably 90° C. or over but 200° C. or below.

Preferable specific examples of the polyesters for use in the present invention are shown below, but the present invention is not restricted to them.

Polyester Compound Examples:
Homopolymer:
POL-1: [2,6-naphthalenedicarboxylic acid (NDCA)/ethylene glycol (EG) (100/100)] (Tg=119° C.) (PEN).
Copolymers (the entry in the parentheses represents the molar ratio):
POL-2: 2,6-NDCA/TPA(terephthalic acid)/EG (50/50/100) (Tg=92° C.)
POL-3: 2,6-NDCA/TPA/EG (75/25/100) (Tg=102° C.)
POL-4: 2,6-NDCA/TPA/EG/BPA (bisphenol A) (50/50/75/25) (Tg=112° C.)
POL-5: NDCA/sulfoisophthalic acid-sodium salt/EG (98/2/100) (Tg=117° C.)
Polymer blends (the entry in the parentheses represents the weight ratio):
POL-6: POL-1/PET (80/20) (Tg=104° C.)
POL-7: PAr/POL-1 (50/50) (Tg=142° C.) (PAr:TPA/BPA ; Tg=192° C.) (PET: TPA/EG ; Tg=80° C.)
POL-8: PEN/PET/PAr (50/25/25) (Tg=108° C.)

These films may have a polar group (e.g., epoxy, $COO_2M$, OH, $NR_2$, $NR_3X$, $SO_3M$, $OSO_3M$, $PO_3M_2$, and $OP_3M_2$, wherein M represents H, an alkali metal, or ammonium, and R represents H or an alkyl group having 1 to 20 carbon atoms).

However, by far the most preferred polyalkylene naphthalate for use as support for a photographic material according to the present invention is simply the homopolymer of 2,6-naphthalenedicarboxylic acid and ethylene glycol (PEN) and most of the further description and examples will deal with this polyester.

The thickness of such a support for use in the present invention is 40 to 500 μm, preferably 60 to 200 μm.

Preferred examples of useful UV absorbing compounds according to formula (I) include:

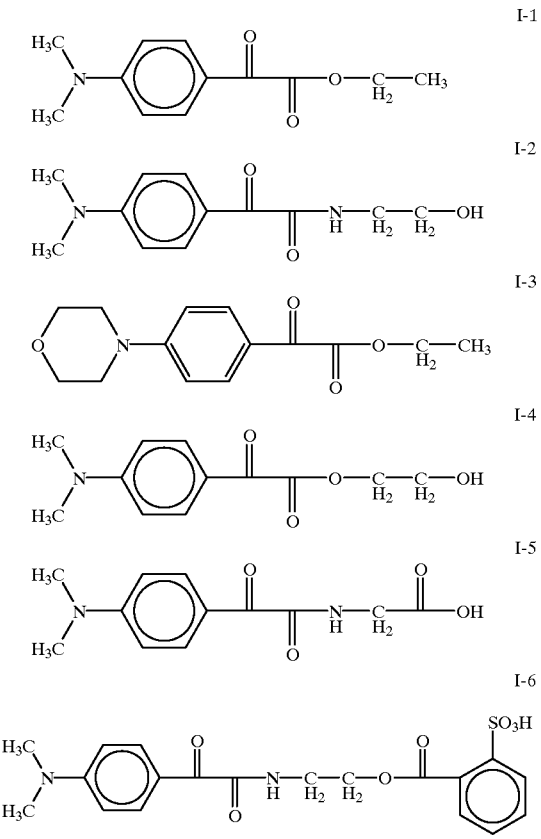

The UV-absorbers according to the present invention can be prepared according to methods described in EP 0 747 756, p. 3–6 and according to the references incorporated therein.

The UV-absorbers can be incorporated in the polyalkylene naphthalate film by various techniques. They can be mixed with the dried PEN granulate, molten together at about 280–300° C. and extruded to form a film. On the other hand a master batch of PEN+UV-absorber is first prepared which is added to blank PEN by means of a dosing apparatus during extrusion. Alternatively, the UV-absorber can be added during synthesis of the PEN after the transesterification step but before the polycondensation step. It will be clear that in the latter process the requirements posed to the UV-absorber concerning thermal stability are even more stringent. Finally, the UV-absorber molecule can even be incorporated chemically in the polyester polymeric chain by a method as disclosed in e.g. WO 95/04769 and U.S. Pat. No. 5,310,857.

The UV-absorbers used in accordance with the present invention are preferably incorporated in an amount between 0.1% and 1.0% versus polyalkylene naphthalate. In order to be effective they must absorb between 200 and 400 nm. Most preferably, the wavelenght of maximal absorption is between 300 nm and 400 nm. The UV-aborbers can be used alone or as mixtures of more then one compound. They can also be mixed with UV-absorbers outside the scope of the present invention.

In the embodiment wherein the PEN is used as support for a photographic element it is advisable to add a mixture of dyes resulting in a so-called "grey base" for the prevention of so-called "light piping". This phenomenon is caused by the fact that the refractive index of gelatin being the major constituent of photographic layers is 1.50–1.55 while the refractive index of polyesters such as PEN is as high as 1.6–1.7. As a result unwanted light entering from a film edge tends to be reflected at the interface between the base and the hydrophilic layers resulting in edge fogging.

The polyalkylene film of the present invention can contain various agents improving slidability such as $SiO_2$, $TiO_2$, $BaSO_4$, $CaCO_3$, talc, kaolin, clay, alumina silicates and silicone particles. It can also contain spacing agents such as polymethylmethacrylate beads, polystyrene beads, and TOSPEARL siloxane beads (registered trade mark of Toshiba Co).

When the polyalkylene naphtalate film containing a UV-absorber according to the present invention is used as a support for a photographic material it is preferably provided with a so-called subbing layer. An example of a suitable subbing layer is a layer containing a polymer containing covalently bound chlorine. Suitable chlorine containing polymers are e.g. polyvinyl chloride, polyvinylidene chloride, a copolymer of vinylidene chloride, an acrylic ester and itaconic acid, a copolymer of vinyl chloride and vinylidene chloride, a copolymer of vinyl chloride, vinylidene chloride and itaconic acid, a copolymer of vinyl chloride, vinyl acetate and vinyl alcohol, A preferred chlorine containing polymer is co(vinylidenechloride-methylacrylate-itaconic acid; 88%/10%/2%). A most suitable subbing layer contains the latter polymer and a colloidal silica such as KIESELSOL 100F (Bayer AG). Optionally to this composition can be added co(methylacrylate-butadieneitaconic acid) (49/49/2), preferably in a ratio of about 10%. The most favourable adhesion properties are obtained when a subbing layer as described above provided with an additional primer layer containing gelatin (preferably 0.25–0.35 $g/m^2$), Kieselsol 300 F (0.30–0.40 $g/m^2$) and a matting agent on the base of polymethylmethacrylate (average size 2 à 3 $\mu$m) at a coverage of about 0.001 $g/m^2$.

In a most preferred embodiment of the present invention the polyalkylene naphthalate film serves as support for a photographic silver halide material. This material can be suited for general amateur- or professional photography, for graphic arts application, for recording or display of radiographic information, for cinematographic recording and display, for micrography, and for duplicating purposes. In a preferred embodiment however of the present invention the photographic material is a colour negative or colour reversal material for general photography. In a most preferred embodiment this colour photographic material is slit, cut and packaged according to the specifications of the so-called Advanced Photographic System (APS). As explained above, PEN is particularly suited as support for an APS photographic material since problems with memory curl are more easily avoided with PEN than with PET.

Colour negative and colour reversal materials usually comprise two or three red sensitive emulsion layers containing a cyan coupling colour coupler, two or three green sensitive emulsion layers containing a magenta coupling colour coupler, and two or three blue sensitive layers containing a yellow coupling colour coupler. The layers showing the same spectral sensitivity are differentiated in their photographic speed. Usually a yellow filter layer is present between the blue and green sensitive layers in order to avoid penetration of blue light into the underlying layers.

The most important ingredients of the emulsion layer are the binder, the silver halide emulsion grains, and the various colour couplers.

The binder is a hydrophilic colloid, preferably gelatin. Gelatin can, however, be replaced in part or integrally by synthetic, semi-synthetic, or natural polymers. The gelatin can be lime-treated or acid-treated gelatin. The preparation of such gelatin types has been described in e.g. "The Science and Technology of Gelatin", edited by A. G. Ward and A. Courts, Academic Press 1977, page 295 and next pages.

The halide composition of the silver halide emulsions used according to the present invention is not specifically limited and may be any composition selected from i.a. silver chloride, silver bromide, silver iodide, silver chlorobromide, silver bromoiodide, and silver chlorobromoiodide. However, for colour negative and colour reversal materials that must show recording speed rather sensitive silver iodobromide emulsions are preferred.

The photographic emulsions can be prepared from soluble silver salts and soluble halides according to different methods as described e.g. by P. Glafkides in "Chimie et Physique Photographiclue", Paul Montel, Paris (1967), by G. F. Duffin in "Photographic Emulsion Chemistry", The Focal Press, London (1966), and by V. L. Zelikman et al in "Making and Coating Photographic Emulsion", The Focal Press, London (1966). The silver halide can be precipitated according to the single-jet method, the double-jet method, or the conversion method. The silver halide particles of the photographic emulsions used according to the present invention may have a regular crystalline form such as a cubic or octahedral form or they may have a transition form. They may also have an irregular crystalline form such as a spherical form or a tabular form, or may otherwise have a composite crystal form comprising a mixture of said regular and irregular crystalline forms. They may have a multilayered grain structure such as core/shell. The size distribution of the silver halide particles of the photographic emulsions to be used according to the present invention can be homodisperse or heterodisperse.

The emulsion can be desalted in the usual ways e.g. by dialysis, by flocculation and re-dispersing, or by ultrafiltration.

The light-sensitive silver halide emulsion can be a so-called primitive emulsion, in other words an emulsion that has not been chemically sensitized. However, the light-sensitive silver halide emulsion can be chemically sensitized as described i.a. in the above-mentioned "Chimie et Physique Photographique" by P. Glafkides, in the above-mentioned "Photographic Emulsion Chemistry" by G. F. Duffin, in the above-mentioned "Making and Coating Photographic Emulsion" by V. L. Zelikman et al, and in "Die Grundlagen der Photographischen Prozesse mit Silberhalogeniden" edited by H. Frieser and published by Akademische Verlagsgesellschaft (1968).

The light-sensitive silver halide emulsions can be spectrally sensitized with methine dyes such as those described by F. M. Hamer in "The Cyanine Dyes and Related Compounds", 1964, John Wiley & Sons. Dyes that can be used for the purpose of spectral sensitization include cyanine dyes, merocyanine dyes, complex cyanine dyes, complex merocyanine dyes, hemicyanine dyes, styryl dyes and hemioxonol dyes. Particularly valuable dyes are those belonging to the cyanine dyes, merocyanine dyes and complex merocyanine dyes. Also so-called supersensitizers can be used.

Details on colour couplers can be found in Research Disclosure 37254, Section 4 (1995) p. 288, and in item 37038, Section II (1995).

Compounds that on reaction with oxidized developer liberate a so-called photographically useful substance are often incorporated in colour photographic materials in order to improve granularity, sharpness and colour separation. Examples of such compounds include DIR couplers which set free development inhibitors, DAR couplers, BIR and BAR couplers. More details on such special couplers can be found in Research Disclosure 37254, Section 5 (1995), p. 290 and Research Disclosure 37038, Section XIV (1995), p. 86.

The hydrophobic colour couplers and other hydrophobic ingredients are commonly dissolved or dispersed in high-boiling organic solvents, so-called oilformers. These solutions or dispersions are then dispersed in the hydrophilic gelatinous coating solution and are present after coating in the dried emulsion layer as droplets of size between 0.05 and 0.8 $\mu$m. More details can be found in Research Disclosure 37254, Section 6 (1995), p. 292.

Usually non-light sensitive hydrophilic layers are arranged between the layers packs of different spectral sensitivity. They contain compounds able to prevent the diffusion of oxidized developer products between layers of different sensitivity. Useful compounds are disclosed in Research Disclosure 37254, Section 7 (1995), p. 292, and in Research Disclosure 37038, Section III (1995), p. 84.

The layers of the photographic material may further contain UV-absorbers, whitening agents, spacing agents, antioxidants, filter dyes, antihalation dyes, colour correction dyes, dye stabilizers, antifoggants, plasticizers, etc. A survey of useful compounds can be found in Research Disclosure 37254, Section 8 (1995), p. 292, and in Research Disclosure 37038, Sections IV, V, VI, VII, X, XI, and XII (1995), p. 84.

Suitable hardening agents for the gelatinous layers are disclosed in Research Disclosure 37254, Section 9 (1995), p. 294, and in Research Disclosure 37038, Section XII (1995), p. 86.

The photographic materials comprising the support in connection with the present invention are exposed and processed according to their particular design and application. Details on processing and its chemicals are described in Research Disclosure 37254, Section 10 (1995), p. 294, and in Research Disclosure 37038, Section XVI to XXIII (1995), p. 95.

It is explicitly contemplated that the scope of the present invention extends beyond the use of the described polyalkylene naphthalate film as a support for a photographic material. Alternatively, the polyester film can be used as packaging material for food and beverages, as insulating material, as carrier for audio and video tapes, as receiver base for ink jet printing, as receiver base for electrostatic images (transparex), as membrane touch switches, and as capacitor film. Other applications include e.g. use as support for printing plates, for thermal sublimation systems, for direct thermal systems, for flexible printed circuit boards, etc.

The following examples illustrate the present invention without however being limited thereto.

EXAMPLES

Example 1

Thermal stability and other physical properties of UV-absorbers.

A suitable UV-absorber must be sufficiently resistant to thermal decomposition at the extrusion temperature of or blending temperature with PEN (about 300° C.). The thermal stability was determined by means a SEIKO TG/DTA320 instrument. The thermobalance was installed on a horizontal differential system. Samples were heated in open aluminum pans on static air. The speed of heating was 10° C./min from ambient temperature to 300° C., or to the end of the weight loss. The sample weights were in the range of 10 to 15 mg, while an empty aluminum pan was used as reference. The method of calculating TGA is based on JIS K7120 (1987) and ISO 7111 (1987). In table 1 the losses of weight, expressed by percent, between the start temperature of the decomposition and 300° C., are represented. The table is completed with values of wavelenght of maximal absorption and melting points (m.p.). The table also contains comparison LW-absorbers belonging to the scope of EP 0 631 177 or EP 0 711 803, cited above. The formulas of these comparison compounds are given behind table 1.

TABLE 1

| Compound | Source | range decomp. | % weight loss | $\lambda_{max}$ nm | m.p. |
|---|---|---|---|---|---|
| invention UV-absorbers: | | | | | |
| I-1 | | 160/300 | 98 | 356 | 100 |
| I-2 | | 216/300 | 35 | 358 | 156 |
| I-3 | | 205/300 | 45 | — | 105 |
| I-4 | | 190/300 | 23 | — | 106 |
| I-5 | | 179/300 | 28 | 358 | 158 |
| I-6 | | 252/300 | 13 | — | 237 |
| comparison UV-absorbers (cf. generic formulas in EP 0 631 177) benzotriazoles: | | | | | |
| TINUVIN 900 | Ciba-Geigy | 280/300 | 4 | 346 | 143 |
| TINUVIN 326 | " | 190/300 | 55 | 352 | 139 |
| TINUVIN 350 | " | 190/300 | 98.6 | 343 | 82 |
| TINUVIN 329 | " | 200/300 | 55 | 341 | 103 |
| aromatic ketones: | | | | | |
| UVINUL 400 | BASF | 164/300 | 98.7 | 315 | 146 |
| UVINUL 3049 | " | 208/300 | 50 | 340 | 131 |
| UVINUL D50 | " | 220/300 | 17 | 346 | 196 |
| cinnamic acid esters: | | | | | |
| UVINUL 3088 | BASF | 178/300 | 85 | 310 | (liq.) |
| UVINUL N35 | " | 170/295 | 100 | 310 | 95 |
| UV-abs. 318 cyclic iminoester | Bayer | 161/275 | 100 | 324 | 82 |

TABLE 1-continued

| Compound | Source | range decomp. | % weight loss | $\lambda_{max}$ nm | m.p. |
|---|---|---|---|---|---|
| (disclosed in EP 0 711803): | | | | | |
| CYASORB UV-3638 | Cytec | 280/300 | 4 | 349 | 310 |

Conclusion: with a few exceptions, the thermal stability of the invention compounds is equal to or better than the comparison compounds.

Formulas of the comparison compounds:

Tinuvin 900

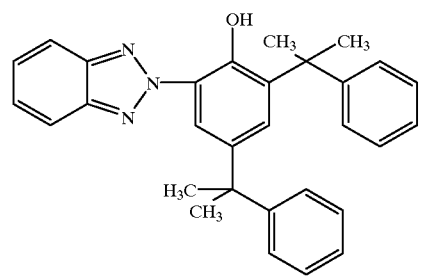

Tinuvin 326

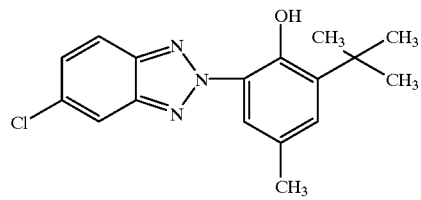

Tinuvin 350

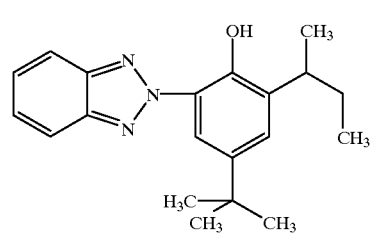

Tinuvin 329

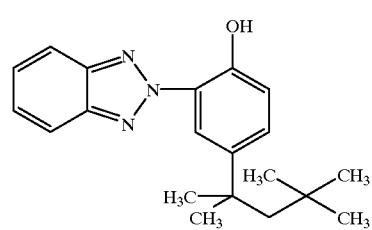

Uvinul 400

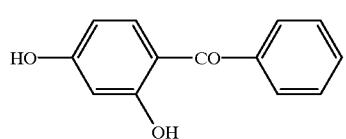

Uvinul D50

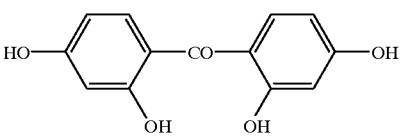

Uvinul N35

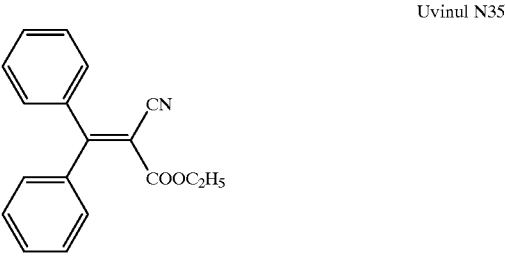

UV-absorber 318

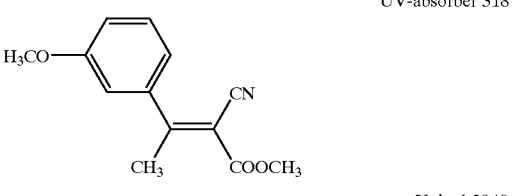

Uvinul 3049

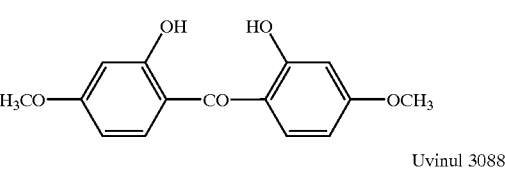

Uvinul 3088

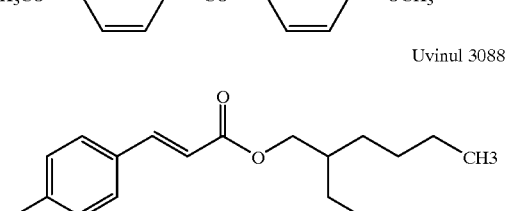

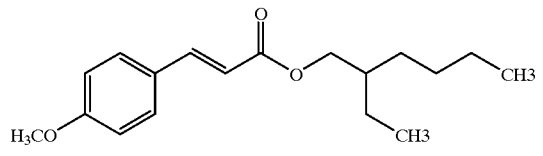

Example 2

% relative fluorescence at 429 nm of PEN+UV-absorber blends.

A series of blends of PEN with each of the UV-absorbers of table 1 was synthetized by melting in a glass reactor a mixture of dried PEN granulate (4 hours at 160° C. in vacuo) together with 0.10 to 1.0 % by weight of UV-absorber at 280° C. under nitrogen atmosphere, and by stirring the reaction mixture at this temperature for 20 minutes. The mixture was laid down on aluminum foil, cooled to room temperature and milled to a powder. From each blend sample a film was extruded having a thickness of about 1 mm. By longitudinal and transversal stretching (3×3) a final film having a thickness of 100 μm was obtained. The intensity of fluorescence caused by excitation at a wavelenght of 380 nm was measured at the emission wavelenght of 429 nm by means of a Perkin-Elmer spectrophotometer MPF44B. As defined above, the relative fluorescence was expressed as:

% rel. fluor.=(1/1*)×100 wherein 1=fluorescence intensity of the blend, and 1*=fluorescence intensity of a blank PEN film. The results are summarized in table 2.

TABLE 2

| UV-absorber in blend | conc. (%) of UV-abs. | % rel. fluor. at 429 nm |
|---|---|---|
| invention samples | | |
| I-1 | 0.1 | 63 |
| I-1 | 0.25 | 29 |
| I-2 | 0.50 | 17 |
| I-3 | 0.50 | 21 |
| I-4 | 0.50 | 14.5 |
| I-5 | 0.50 | 17 |
| I-6 | 0.50 | 44 |
| comparison samples: benzotriazoles: | | |
| TINUVIN 900 | 0.25 | 75 |
| TINUVIN 900 | 1.00 | 32 |
| TINUVIN 326 | 0.25 | 55 |
| TINUVIN 350 | 0.25 | 70 |
| TINUVIN 329 | 0.25 | 68 |
| aromatic ketones: | | |
| UVINUL 400 | 0.25 | 70 |
| UVINUL 3049 | 0.25 | 98 |
| UVINUL D50 | 0.25 | 73 |
| cinnamic acid esters: | | |
| UVINUL 3088 | 0.25 | 78 |
| UVINUL N35 | 0.25 | 79 |
| UV-abs. 318 | 0.25 | 72 |
| cyclic iminoester: | | |
| CYASORB UV-3638 | 0.25 | 77 |
| blank PEN | — | 100 |

Conclusion: the invention UV-absorbers are much more effective as UV fluorescence quenchers than the comparison compounds.

I claim:

1. Polyester film made of polyalkylene naphthalate or a derivative thereof and containing an UV-absorber according to following general formula (I):

$$Q\text{—}CO\text{—}CO\text{—}X \qquad (I)$$

wherein Q represents a substituted or unsubstituted carbocyclic aromatic or hetero-aromatic ring, and —X represents —N($R^1$)($R^2$), —$OR^3$, or $R^7$, wherein each of $R^1$ and $R^2$ independently represents H, substituted or unsubstituted alkyl, substituted or unsubstituted aryl, or substituted or unsubstituted heteroaryl, and $R^7$ represents substituted or unsubstituted aryl, or substituted or unsubstituted heteroaryl; $R^3$ represents the same as $R^1$ and $R^2$ or a metal atom.

2. Polyester film according to claim 1 wherein Q— is represented by Y—Ar— wherein Ar represents a substituted or unsubstituted carbocyclic aromatic ring, and Y— represents —N($R^4$)($R^5$) or —$OR^6$, wherein each of $R^4$ and $R^5$ independently represents H, substituted or unsubstituted alkyl, substituted or unsubstituted aryl, or substituted or unsubstituted heteroaryl, and $R^6$ represents the same as $R^4$ and $R^5$ or a metal atom.

3. Polyester film according to claim 1 wherein said polyalkylene naphthalate or derivative thereof is the homopolymer of naphthalene-2,6-dicarboxylic acid and ethylene glycol (PEN).

4. Photographic material comprising a support and at least one silver halide emulsion layer characterized in that said support is made of polyalkylene naphthalate or a derivative thereof and contains an uV-absorber according to following general formula:

$$Q\text{—}CO\text{—}CO\text{—}X \qquad (I)$$

wherein Q represents a substituted or unsubstituted carbocyclic aromatic or hetero-aromatic ring, and —X represents —N($R^1$)($R^2$), —$OR^3$, or $R^7$, wherein each of $R^1$ and $R^2$ independently represents H, substituted or unsubstituted alkyl, substituted or unsubstituted aryl, or substituted or unsubstituted heteroaryl, and $R^7$ represents substituted or unsubstituted aryl, or substituted or unsubstituted heteroaryl; $R^3$ represents the same as $R^1$ and $R^2$ or a metal atom.

5. Photographic material according to claim 4 wherein Q— is represented by Y—Ar— wherein Ar represents a substituted or unsubstituted carbocyclic aromatic ring, and Y— represents —N($R^4$)($R^5$) or —$OR^6$, wherein each of $R^4$ and $R^5$ independently represents H, substituted or unsubstituted alkyl, substituted or unsubstituted aryl, or substituted or unsubstituted heteroaryl, and $R^6$ represents the same as $R^4$ and $R^5$ or a metal atom.

6. Photographic material according to claim 4 wherein said polyalkylene naphthalate or derivative thereof is the homopolymer of naphthalene-2,6-dicarboxylic acid and ethylene glycol (PEN).

7. Photographic material according to claim 4 wherein the material is a colour negative material or a colour reversal material.

* * * * *